(12) United States Patent
Vilmenay

(10) Patent No.: US 9,894,821 B1
(45) Date of Patent: Feb. 20, 2018

(54) AUXILIARY HANDLE FOR HAND TOOL SHAFT

(71) Applicant: Jean Vilmenay, Westwood, MA (US)

(72) Inventor: Jean Vilmenay, Westwood, MA (US)

( * ) Notice: Subject to any disclaimer, the term of this patent is extended or adjusted under 35 U.S.C. 154(b) by 0 days.

(21) Appl. No.: 15/288,798

(22) Filed: Oct. 7, 2016

(51) Int. Cl.
  *A01B 1/02* (2006.01)
  *B25G 1/06* (2006.01)
  *B25G 3/00* (2006.01)

(52) U.S. Cl.
  CPC ............... *A01B 1/026* (2013.01); *B25G 1/06* (2013.01); *B25G 3/00* (2013.01)

(58) Field of Classification Search
  CPC .............. B25G 1/06; B25G 3/00; A01B 1/026
  USPC .......................................... 16/426, 428, 422
  See application file for complete search history.

(56) References Cited

U.S. PATENT DOCUMENTS

| | | | | |
|---|---|---|---|---|
| 2,356,209 A * | 8/1944 | Brilhart | ................... | G10G 5/005 224/258 |
| 4,103,954 A | 8/1978 | Vaslas | | |
| 4,109,905 A * | 8/1978 | Meier | ................... | A63B 69/12 24/115 H |
| 4,772,057 A * | 9/1988 | Harvey | ................... | A01B 1/026 224/250 |
| 4,791,702 A * | 12/1988 | McVey | ................... | A45F 5/10 16/428 |
| 4,918,785 A * | 4/1990 | Spinner | ................... | F16G 11/14 16/428 |
| 4,944,541 A | 7/1990 | Waldschmidt | | |
| 5,082,156 A * | 1/1992 | Braun | ................... | A45F 5/00 224/220 |
| 5,090,691 A * | 2/1992 | Pollock | ................... | A63B 21/151 16/426 |
| 5,307,966 A * | 5/1994 | Inaba | ................... | A44B 11/06 224/218 |
| 5,411,305 A | 5/1995 | Revoldt | | |
| 5,431,468 A | 7/1995 | Rosenshine | | |
| 5,472,252 A | 12/1995 | Barone | | |
| 5,499,852 A | 3/1996 | Seigeldahl | | |
| 5,625,922 A * | 5/1997 | Morad | ................... | A46B 17/02 16/426 |
| 5,636,409 A * | 6/1997 | Akins | ................... | F16M 11/08 16/111.1 |
| 5,704,672 A * | 1/1998 | Sims | ................... | A01B 1/026 16/400 |
| 5,722,117 A * | 3/1998 | Nielsen | ................... | A45F 5/1046 16/411 |
| 5,871,246 A | 2/1999 | Simdom | | |
| 6,036,626 A * | 3/2000 | Taylor | ................... | A63B 21/0004 482/121 |
| 6,062,619 A | 5/2000 | Clark | | |
| 6,216,319 B1 * | 4/2001 | Elkins | ................... | A45F 5/00 224/221 |
| 6,428,927 B1 * | 8/2002 | Kump | ................... | A45F 5/10 29/623.1 |
| 6,592,160 B1 | 7/2003 | Nicolay | | |

(Continued)

*Primary Examiner* — Jeffrey O'Brien
(74) *Attorney, Agent, or Firm* — Bookstein IP Law

(57) ABSTRACT

An easily attachable and detachable auxiliary handle is provided for use with a tool having an elongate handle such as a shovel, pitchfork or the like. The point of attachment of the device to the tool handle can be adjusted along the length of the handle to suit the individual using the tool. The device requires no tools and is readily interchangeable between a variety of tools and is highly portable.

7 Claims, 4 Drawing Sheets

(56) References Cited

U.S. PATENT DOCUMENTS

| | | | |
|---|---|---|---|
| 6,961,978 B2 * | 11/2005 | Earley | A45C 13/22 16/406 |
| 7,032,942 B2 * | 4/2006 | Stuart | A01B 1/026 16/426 |
| 7,077,444 B2 | 7/2006 | Kaufman | |
| 7,093,324 B2 * | 8/2006 | Udy | A45F 3/14 16/428 |
| 7,484,273 B1 * | 2/2009 | Dupree | A01K 27/004 24/3.13 |
| 7,681,933 B2 | 3/2010 | Chessness | |
| 7,866,720 B2 | 1/2011 | Haws | |
| 8,182,007 B2 | 5/2012 | Fischer | |
| 8,491,024 B2 | 7/2013 | Hayes | |
| 8,720,462 B2 * | 5/2014 | Vieira | B25G 1/02 135/118 |
| 8,782,854 B1 * | 7/2014 | Samuels | B25G 1/102 16/428 |
| 8,904,603 B1 * | 12/2014 | Samuels | A63B 21/0557 16/428 |
| 9,326,437 B2 | 5/2016 | Hanson et al. | |
| 2005/0092789 A1 * | 5/2005 | Giacona, III | A45C 13/30 224/148.6 |
| 2005/0173477 A1 * | 8/2005 | Scott | A45F 5/02 224/148.6 |
| 2007/0095870 A1 * | 5/2007 | Griffith | A45C 13/30 224/219 |
| 2008/0054660 A1 | 3/2008 | Wensman | |
| 2011/0094011 A1 * | 4/2011 | Klekamp | A63B 21/4021 2/170 |
| 2011/0155776 A1 * | 6/2011 | Uehara | A45C 13/30 224/255 |
| 2014/0130752 A1 * | 5/2014 | Ring | A01K 27/001 119/793 |
| 2016/0050887 A1 * | 2/2016 | Polcyn | A01K 27/003 119/797 |

* cited by examiner

AUXILIARY HANDLE FOR HAND TOOL SHAFT

FIELD

This relates to attachments to facilitate the use of hand tools having an elongate shaft such as shovels, pitchforks and the like.

BACKGROUND

Use of hand tools such as shovels, pitchforks similar tools having an elongate shaft require physical exertion that may tend to result injury or strain to back or other muscles. Often such injury results from bending at the waist to load the tool and then lifting the load using ones back muscles to straighten the body, then depositing or throwing the load to an intended location (snow pile, wagon, etc.). It has been proposed to provide an auxiliary handle on such tools so that the user may grip the tool at two locations, hopefully to provide improved leverage. Typically, such devices are incorporated as an integral part of the tool and cannot be used with another tool. Also, typically, such devices provide for little, if any, adjustment to the point of attachment to the shaft of the tool to accommodate a particular user's size, strength and comfort.

It would be desirable, therefore, to provide an auxiliary handle for attachment to the shaft of a tool by which the point of attachment to the tool shaft can be adjusted along the shaft by the user to suit that user's comfort and desired leverage. It also would be desirable to provide such an auxiliary handle that is readily attachable to and detachable from any tool shaft and is easily portable from one work site to another.

DRAWINGS

The features and advantages of the invention may be appreciated more fully from the following description, with reference to the accompanying drawings in which.

DESCRIPTION OF THE ILLUSTRATIVE EMBODIMENTS

Figure 1:
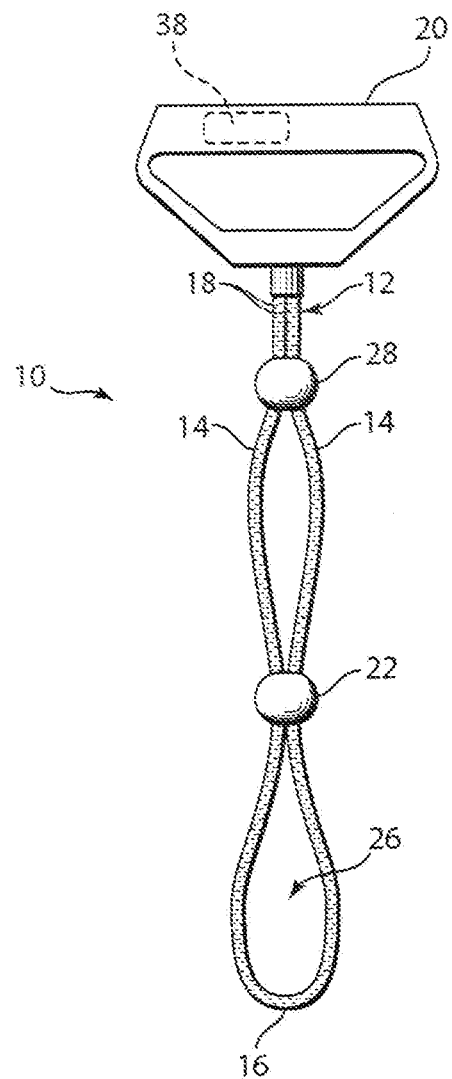
FIG. 1 is an illustration of the auxiliary handle of the invention.

As shown in FIG. 1, the device 10 includes a length of cord 12 that is bent to form a pair of legs 14, a bight 16 and free ends 18 that are attached securely to an auxiliary handle 20. A cinch block 22 having a central bore 24 that receives the legs 14 is slidable along the legs 14, thus defining a variable size loop 26. A locking block 28 is mounted for sliding movement on the legs 14 between the cinch block 22 and auxiliary handle 20.

Figure 2:
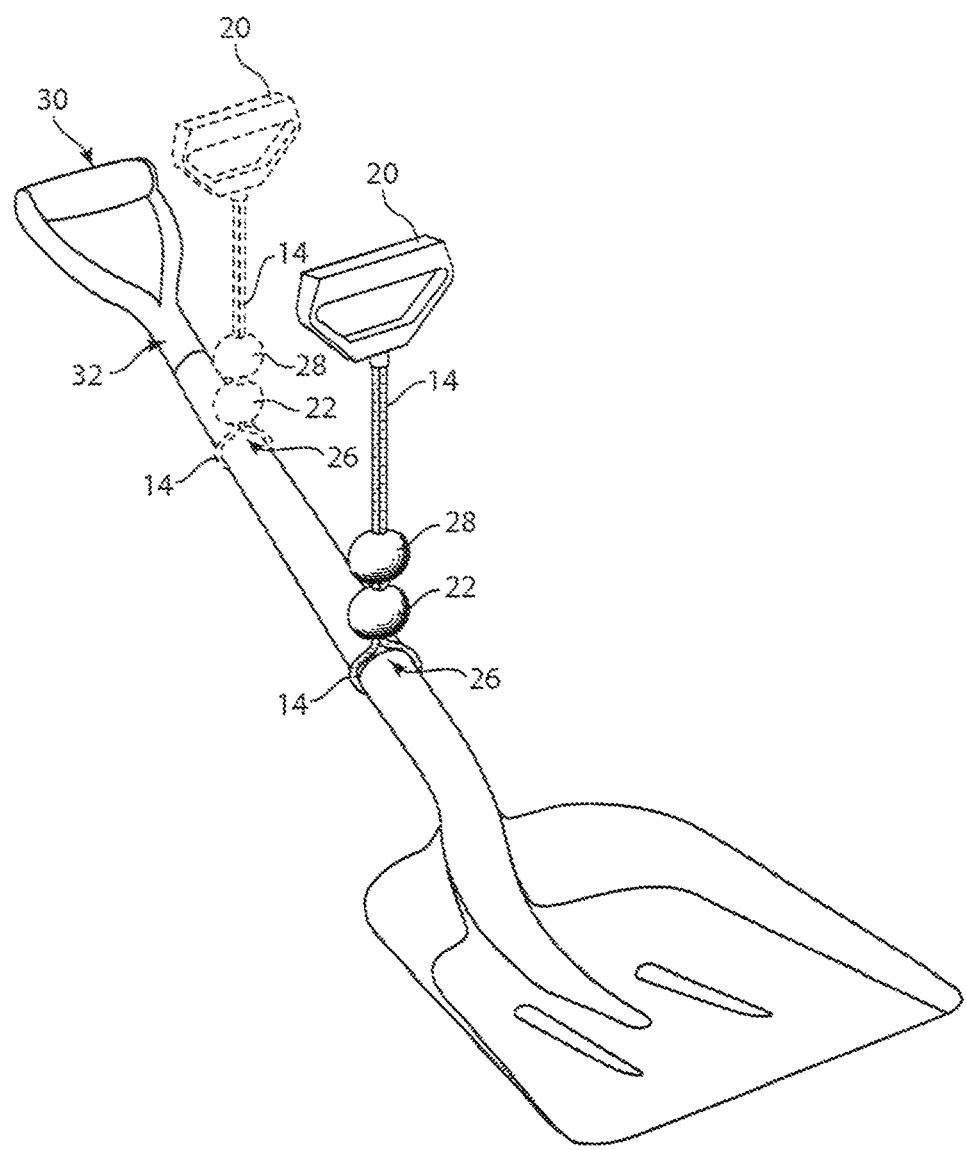
FIG. 2 is an illustration of the manner in which it is used.
Figure 3:
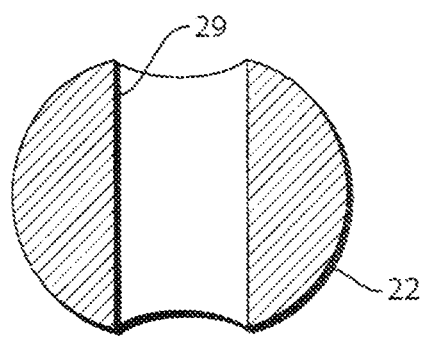
FIG. 3 is a cross section of the cinch block.
Figure 4:
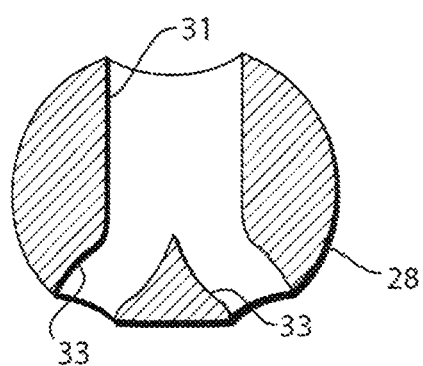
FIG. 4 is a cross section of the locking block.

When used, as shown in FIG. 2, the cinch and locking blocks 22, 28 are slid along the legs 14 to open the loop 26 so that it can fit over the handle 30 that may be attached to the shaft 32 at the user end of the tool. With the loop about the shaft, the user can slide the cinch block 22 toward the other end of the tool to a location along the shaft 32 to move the loop to a position a that the user determines provides the best leverage and comfort for his strength and size. When that position is selected the cinch block 22 is slid to close the loop 26 snugly about the shaft 32. Then the locking block 28 is advanced to a position immediately adjacent the cinch block 22 to lock the device in place to the shaft 32. The device is readily detached from the tool simply by sliding the locking block back toward the auxiliary handle and the sliding the cinch block to enlarge the loop 26 so that it can be slid over the handle of the tool. The portable device then may be used with another tool.

Figure 5:
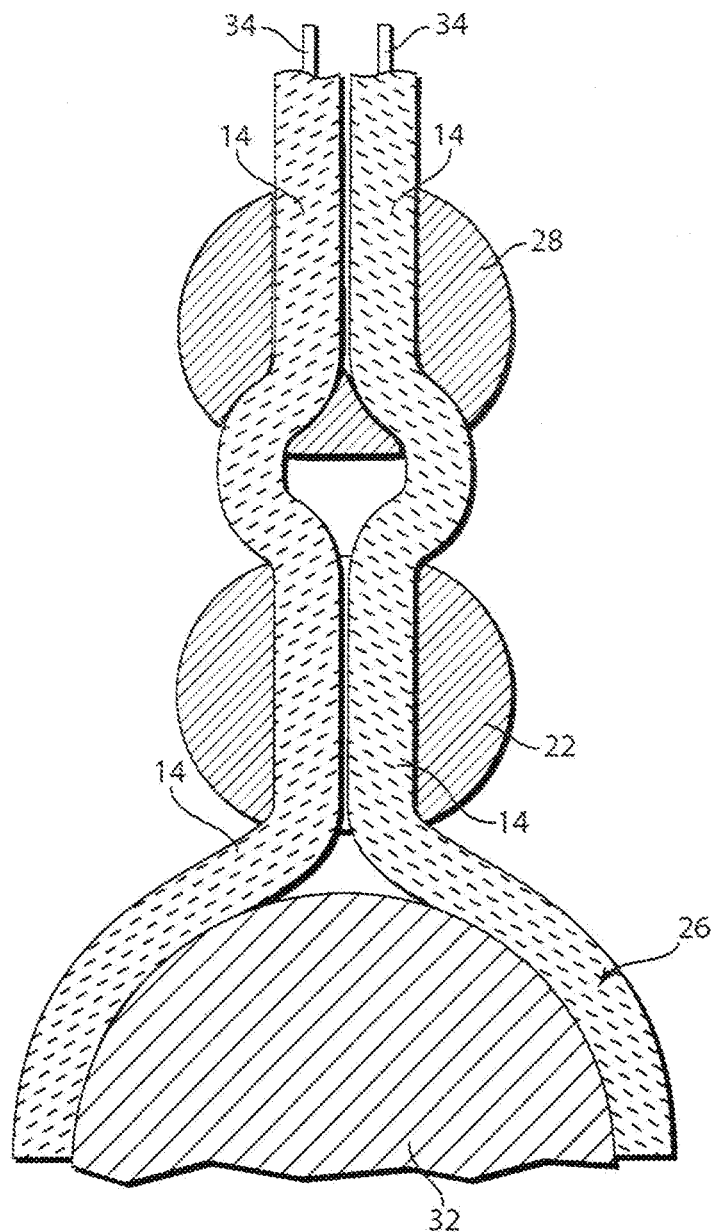
FIG. 5 is a cross section of the device attached to a tool handle with the cinch block and lock block in a secured, fixed positions.

The cinch block 22 and locking block 28 may be formed from a variety of materials such as plastic, metal or wood as well as any other convenient suitable material. The cinch block 22 may be formed in one piece, as by molding, and has a central lumen 29 that preferably is oval in order to accommodate the two legs 14 of the cord 12. The lumen 29 should receive the legs 14 of the cord 12 to allow the cinch block to slide along the legs with slight resistance. The locking block 28 is formed to have a Y-shaped passageway having a main lumen 31 capable of receiving the two legs of the device in the lumen 31 side by side. The main lumen leads to a bifurcated pair of secondary lumens 33, each of which receives one of the legs 14 of the device. The open ends of the secondary lumens 33 are spaced apart to spread the legs 14 wider than permitted by the lumen 29 of the cinch block 22 as shown in FIG. 5. With the loop 26 snug about the shovel shaft 32 and the locking block 28 urged into close proximity to the cinch block 22, the two blocks cooperate to lock the device to the shovel. The point of attachment of the auxiliary handle to the shovel shaft is easily adjusted by separating the locking block from the cinch block to release the grip of the loop 26 on the shaft 32 and sliding the device to the desired location along the shaft 32, as suggested in phantom in FIG. 2, and the cinch and locking blocks the may be retightened to lock the device to the tool handle.

The cord should be selected to be substantially non-extensible and have good strength commensurate with the type of loads with which it may be used. Also, it is desirable that the cord have an outer surface with a relatively high coefficient of friction to facilitate a good frictional grip about the tool shaft 32. I have found that a cord of type used for electrical applications having an inner relatively non-extendible metallic wire core 34 (e.g., copper) and an outer rubber-like surface 36 provides good results. The cord may have an outer diameter of about a quarter of an inch. Other, non-extendible materials with good frictional characteristics may be used.

By way of dimensional example, a device intended for use by most adults may have legs 14, as measured from the bight and to the point of attachment to the handle 20 of about eight to ten inches. The handle may add a few more inches to the total length. A device for use by a person with a smaller build than an adult may find a device with smaller dimensions appropriate.

In some cases a user may wish to leave the device on the tool when not in use. To that end, the handle 20 may be provided with an embedded magnet 38 or other attachment device by which the handle end can be attached to another part of the tool. Thus, the device may be stored on the tool with the loop 26 about the tool shaft and the handle end attached to another part of the tool.

From the foregoing it should be appreciated that the invention provides an easily detachable auxiliary handle for a tool having an elongate shaft that may be used with any such type of tool, is highly portable and enables its user to adjust the leverage provided by the device to suit his or her individual needs.

It should be understood, however, that the foregoing description is intended merely to be illustrative thereof and that other modification, variations and equivalents may be apparent to those skilled in the art without departing from its principles.

Having thus described the invention, I claim:

1. An auxiliary handle for a hand tool having an elongate shaft comprising:
   a handle;
   a flexible cord attached at its ends to the handle and defining a pair of legs terminating in a bight spaced from the handle;
   a cinch block slidable on the legs to define a variable size loop at the bight; and
   a locking member slidable on the legs between the handle and the cinch block;
   wherein the cinch block has a hole to receive the legs of the cord; and
   wherein the locking member has a hole at a first end facing the handle that branches into a pair of holes at a second end facing the cinch block, a spacing between the pair of branched holes constructed to spread the legs apart a distance greater than the diameter of the cinch block hole.

2. An auxiliary handle as defined in claim 1 wherein the cord is substantially non-extensible.

3. An auxiliary handle as defined in claim 2 wherein the cord has an inner reinforcing wire and an outer frictional covering for gripping the tool shaft and maintaining a position on the shaft.

4. An auxiliary handle as defined in claim 1 wherein the legs of the cord are about nine to ten inches in length.

5. An auxiliary handle as defined in claim 1 further comprising: an attaching member associated with the handle and adapted to detachably connect the handle to the tool.

6. An auxiliary handle as defined in claim 5 wherein the attaching member comprises a magnet embedded in the handle.

7. An auxiliary handle for a hand tool having an elongate shaft comprising:
   a handle;
   a flexible cord attached at its ends to the handle and defining a pair of legs terminating in a bight spaced from the handle;
   a cinch block slidable on the legs to define a variable size loop at the bight; and
   a locking member slidable on the legs between the handle and the cinch block, wherein the locking member is configured to slide adjacent to the cinch block to lock the cinch block and the variable size loop at the bight;
   wherein the cord is substantially non-extensible; and
   wherein the cord has an inner reinforcing wire and an outer frictional covering for gripping the tool shaft and maintaining a position on the shaft.

* * * * *